April 29, 1958
W. ARTHURS
2,832,178
CROP PROTECTOR
Filed April 11, 1956
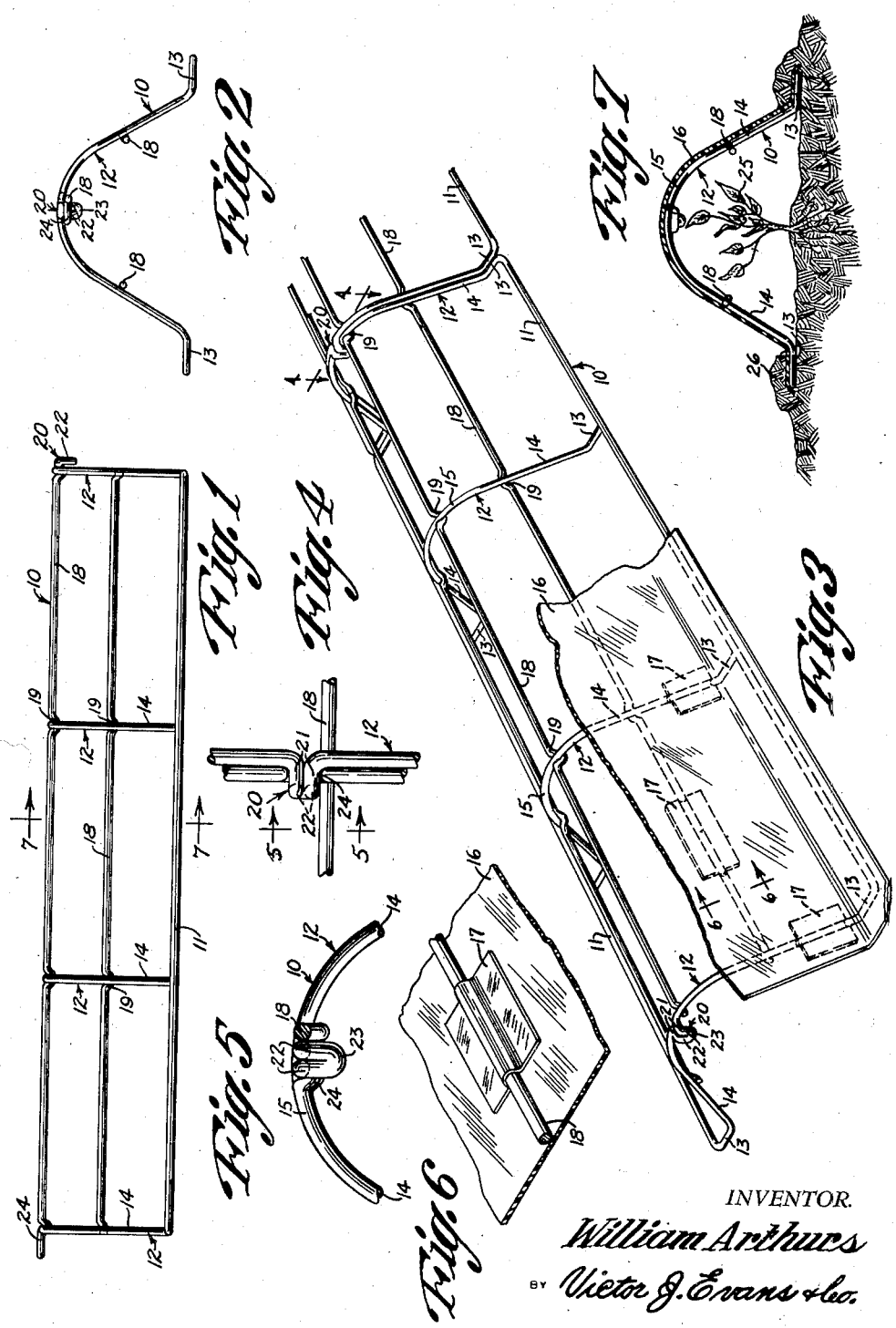
INVENTOR.
William Arthurs
BY Victor J. Evans &Co.
ATTORNEYS

United States Patent Office 2,832,178
Patented Apr. 29, 1958

2,832,178

CROP PROTECTOR

William Arthurs, Lee, Maine

Application April 11, 1956, Serial No. 577,541

1 Claim. (Cl. 47—29)

This invention relates to a crop protector.

The object of the invention is to provide a crop protector which is adapted to be used for protecting row crops such as vegetables, plants, flowers, shrubs or the like.

Another object of the invention is to provide a protector for growing crops or plants wherein the protector includes a frame which has a transparent cover member arranged thereover so that the young or growing crops will have ample protection from inclement or adverse weather conditions as well as insects, bugs or the like and whereby the transparent cover member will permit sunlight to pass therethrough so as to permit the growing plants to reap the benefits of the sunlight.

A further object of the invention is to provide a crop protector which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view of the crop protector frame of the present invention.

Figure 2 is an end elevational view of the frame of Figure 1.

Figure 3 is a perspective view illustrating the crop protector showing the cover member thereon and with parts of the cover member broken away and in section.

Figure 4 is a sectional view taken on the line 4—4 of Figure 3.

Figure 5 is a sectional view taken on the line 5—5 of Figure 4.

Figure 6 is a fragmentary perspective view illustrating a portion of the transparent cover member and transparent retaining tape.

Figure 7 is a sectional view taken on the line 7—7 of Figure 1 and showing the cover member on the frame and showing earth positioned over portions of the device.

Referring in detail to the drawings, the numeral 10 designates the frame of the crop protector which can be made of any suitable material such as heavy wire or the like, and the frame 10 includes a pair of horizontally disposed spaced parallel side members 11. Formed integral with the pair of side members 11 or secured thereto and extending transversely therebetween is a plurality of spaced parallel body members 12. The body members 12 may include a horizontal portion 13 which terminates in an inclined portion 14, and an arcuate portion 15 may interconnect the upper ends of the inclined portions 14 together.

A transparent cover member 16 is adapted to be arranged over the frame 10, and the cover member 16 may be secured to the frame 10 through the medium of transparent tapes 17.

Extending between the plurality of body members 12 and secured thereto in any suitable manner, as for example by welding, is a plurality of horizontally disposed rods or bars 18. The rods 18 may be provided with offset portions 19 which are arranged contiguous to the body members 12 and the offset portions 19 insure that there will be no protruding edges which might damage the cover member 16.

There is further provided a means for interconnecting together a plurality of the frame 10 whereby when the frames 10 are arranged in end to end relation with respect to each other, they can be connected together so that an indeterminate length of growing crops or row crops can be protected. For effecting this connection between the adjacent frames, there is provided on one end of the frame a male member 20 which may include a pair of superposed sections 21 that terminate in downwardly extending sections 22 which are interconnected together by an arcuate section 23. The other end of the frame is provided with a downwardly offset section 24 which defines a female element, and the female element on one end of the frame is adapted to be engaged by the male element on the next adjacent frame so that the adjacent frames can be releasably connected together.

Referring to Figure 7 of the drawings, the numeral 25 designates plants or crops which are to be protected by the present invention, and in Figure 7 the numeral 26 designates earth or dirt which may be piled on top of the side members 11 so as to help anchor the device.

From the foregoing, it is apparent that there has been provided a crop protector which is especially suitable for use in protecting growing plants such as vegetables, fruits, flowers or the like. In use the frame 10 may be positioned as shown in Figure 7 and the transparent cover member 16 may be mounted on the frame 10. The cover member 16 may be secured in place in any suitable manner, as for example by means of transparent tapes 17. Portions, such as the portions 11 of the frame 10 may have earth such as the earth 26 arranged thereon as shown in Figure 7. Thus, the growing plants 25 will be protected from adverse weather condition such as cold, or wind or the like, but nevertheless the transparent cover member 16 will permit the beneficial sun's rays to pass through the cover member and provide for the efficient growing of the plants. Each of the frames 10 includes a male member 20 on one end thereof and a female member 24 on the other end. By this means, a plurality of the frames 10 can be interconnected together so that long rows of growing crops can be protected. The male or female members are adapted to be releasably connected together so that when desired they can be separated. The parts can be made of any suitable material and in any desired shape and size.

The cover member 16 can be made of any suitable transparent material such as a transparent paper or plastic. The present invention can be used on continuous row crops such as carrots, beets, turnips and the like. The frame may be made of heavy gage wire and the device will protect the crops from severe storms or the like. Due to provision of the offset sections 19 in the wires 18 there will be no projecting surfaces which might tear the cover 16. The interlocking male and female elements prevent the frames from accidentally pulling apart. The earth 26 placed over the lower portions of the device serve to help anchor the device and also keep out frost, insects and the like. The device can be used over and over again and the cover member 16 can be readily replaced in the event it becomes torn or worn. If desired, certain of the ends of the device may be covered so as to provide additional protection for the plants or crops.

I claim:

In a crop protector, a frame including a pair of spaced parallel horizontally disposed side members, a plurality of body members extending transversely between said side members, each of said body members including first horizontally disposed portions, inclined portions extending upwardly from said horizontally disposed portions and interconected by arcuate portions, a plurality of spaced parallel horizontally disposed rods extending between said body members and secured thereto, portions of said rods engaging said body members being offset and being secured to said body members, and a cover member extending over said frame, said cover member being made of transparent material, and transparent tapes connecting said cover member to said frame, said side members adapted to have earth positioned thereon, a male member formed in the center of the outermost arcuate portion at one end of said frame and extending outwardly from the arcuate portion at that end of said frame, and a female member formed in the center of the outermost arcuate portion at the other end of said frame and extending outwardly of the arcuate portion on the other end of said frame.

References Cited in the file of this patent
UNITED STATES PATENTS

| | | |
|---|---|---|
| 617,034 | Merriman | Jan. 3, 1899 |
| 936,401 | Baldridge | Oct. 12, 1909 |
| 1,692,229 | Smith | Nov. 20, 1928 |
| 1,910,501 | Schindler | May 23, 1933 |
| 1,916,868 | Starks | July 4, 1933 |
| 2,011,897 | Hauck | Aug. 20, 1935 |
| 2,015,471 | Genuit | Sept. 24, 1935 |

FOREIGN PATENTS

| | | |
|---|---|---|
| 537,989 | Great Britain | July 16, 1941 |